No. 834,566.
PATENTED OCT. 30, 1906.
A. DINA.
GAS ENGINE AND VALVE MECHANISM THEREFOR.
APPLICATION FILED AUG. 18, 1904.
5 SHEETS—SHEET 3.
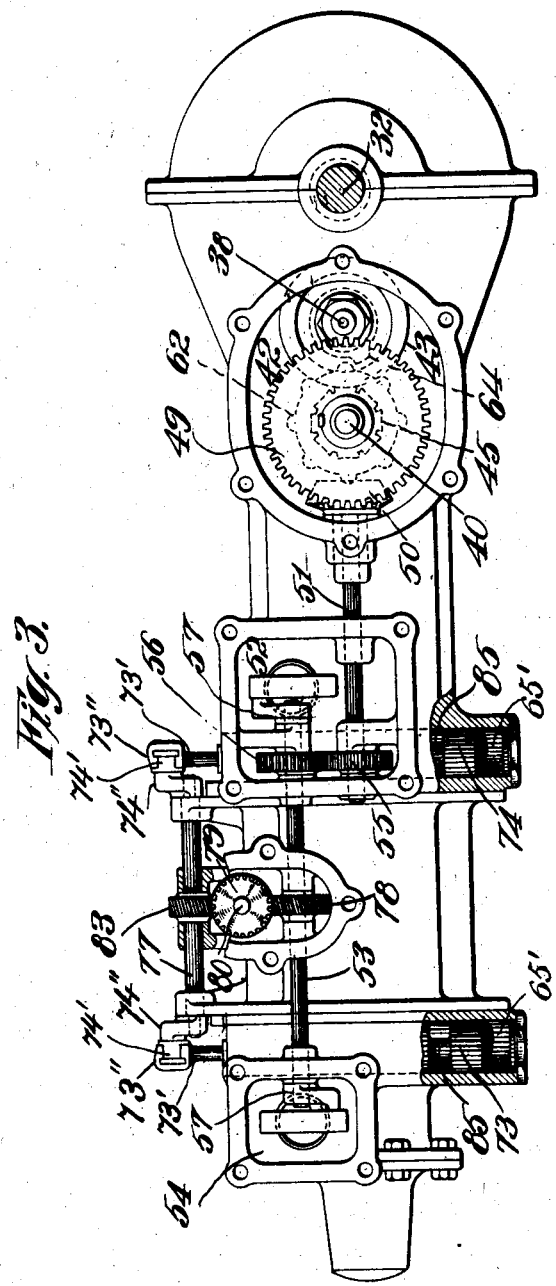
Witnesses:
Robert Adt
C. C. Fuss
Inventor:
Augusto Dina,
By his Attorney,
J. H. Richards.

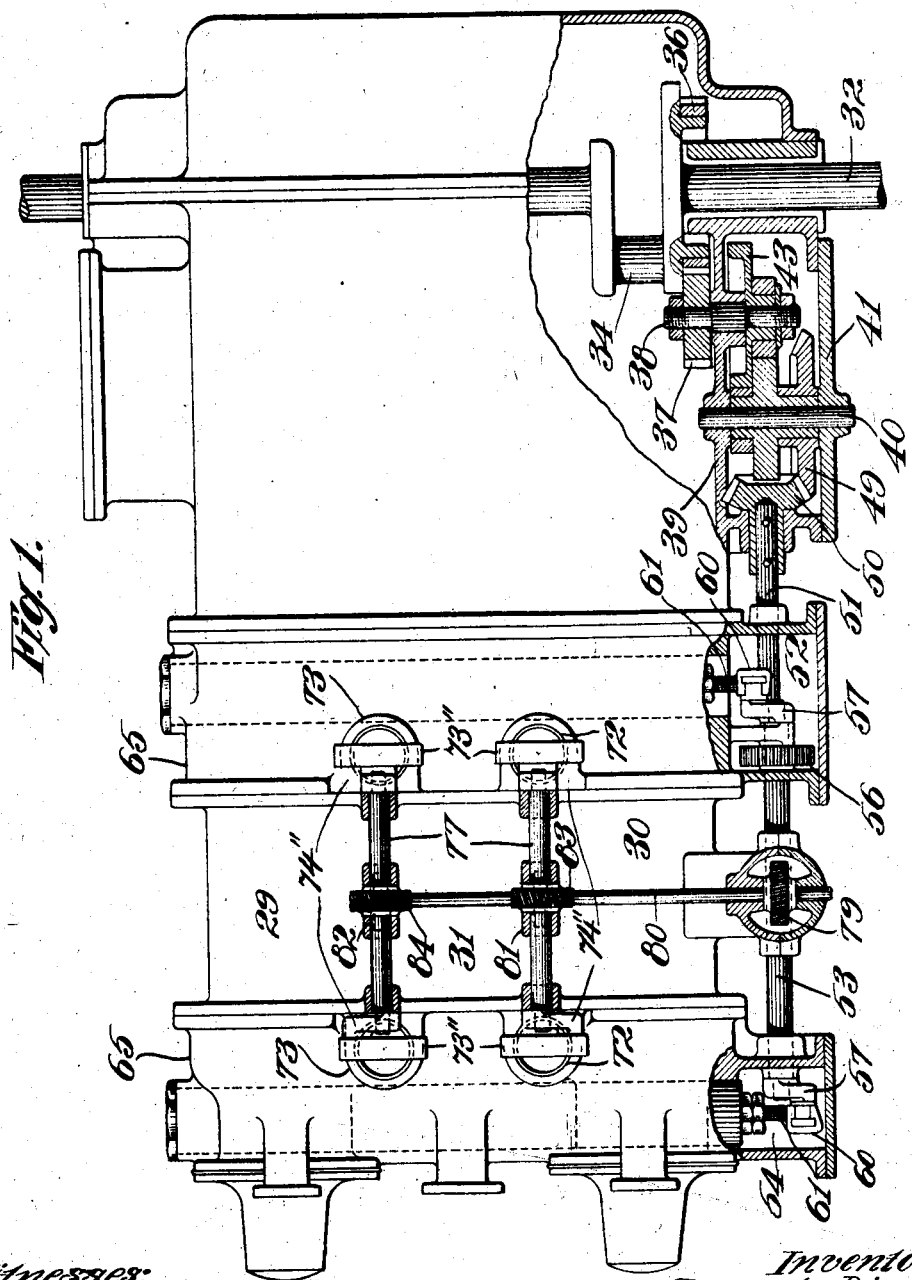

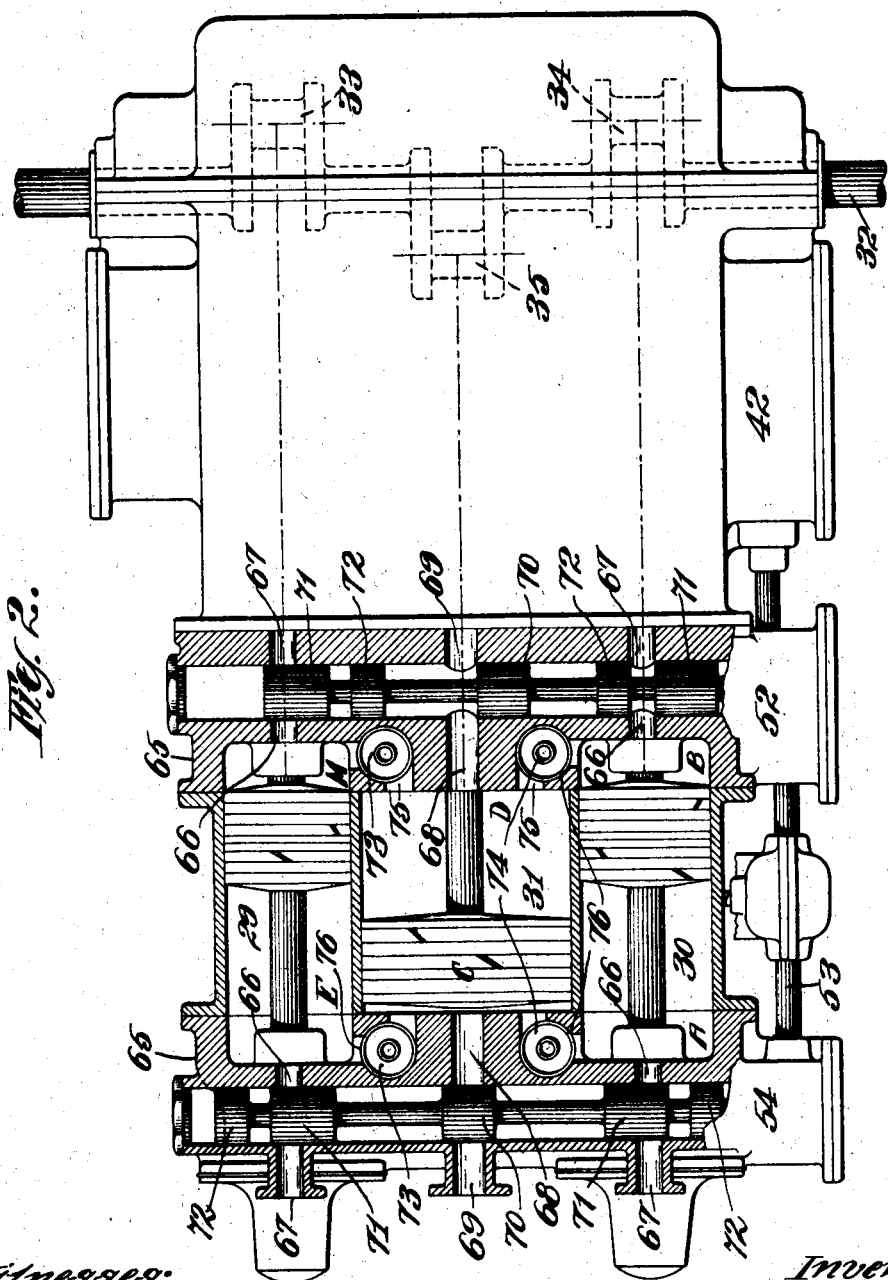

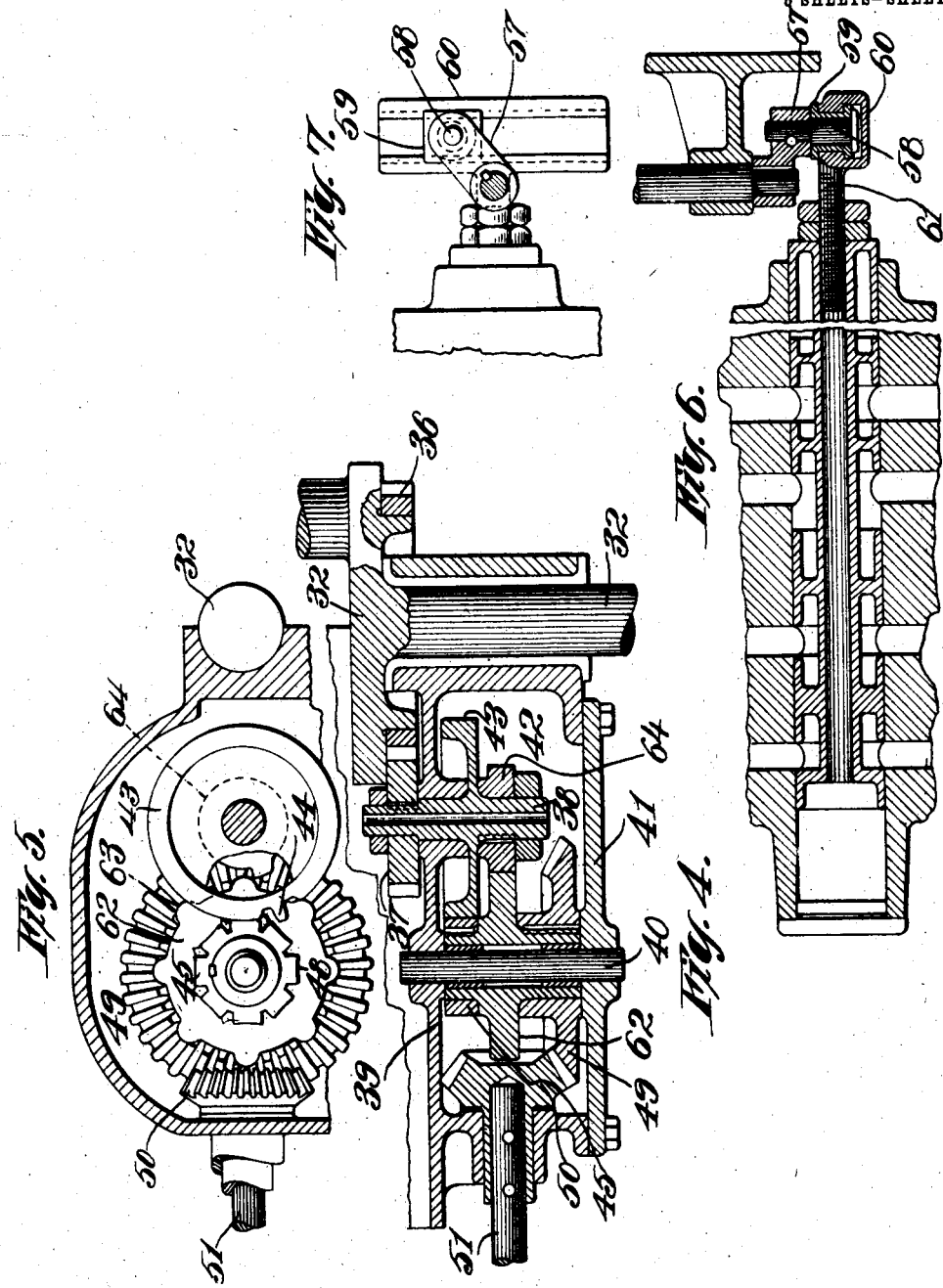

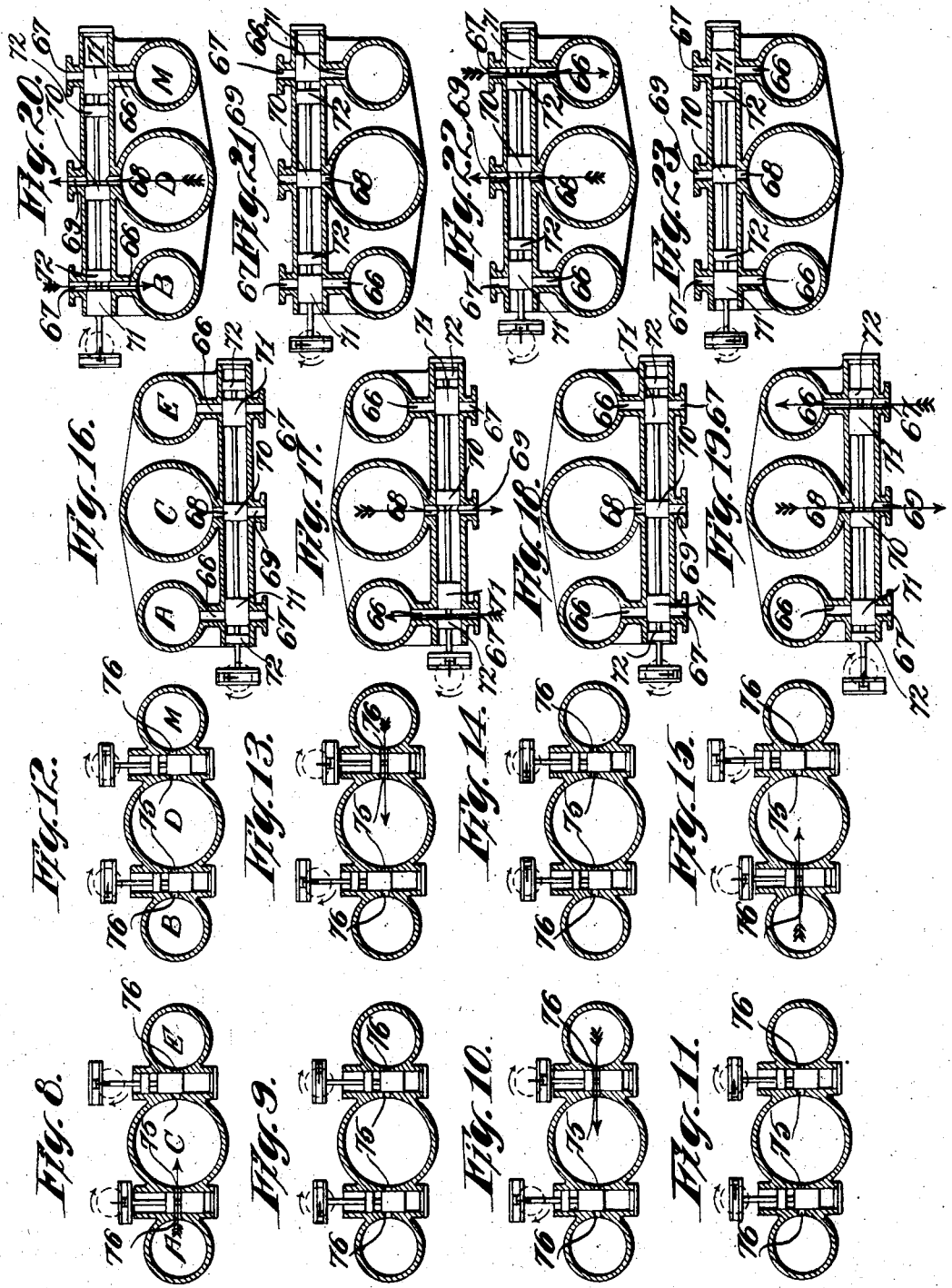

UNITED STATES PATENT OFFICE.

AUGUSTO DINA, OF WEST HOBOKEN, NEW JERSEY, ASSIGNOR TO ALFRED ADAMSON, OF DOBBS FERRY, NEW YORK.

GAS-ENGINE AND VALVE MECHANISM THEREFOR.

No. 834,566.     Specification of Letters Patent.     Patented Oct. 30, 1906.

Application filed August 18, 1904. Serial No. 221,245.

*To all whom it may concern:*

Be it known that I, AUGUSTO DINA, a subject of the King of Italy, residing in West Hoboken, in the county of Hudson and State of New Jersey, have invented certain new and useful Improvements in Gas-Engines and Valve Mechanisms Therefor, of which the following is a specification.

The invention has reference to an organization of motor elements including high and low pressure cylinders, associated with which is a valve mechanism of simple construction for controlling the proper cycle of operations within each cylinder when the plurality thereof are used in conjunction as a compound double-acting internal-combustion motor of the four-cycle type.

One of the most important features characterizing the present motor, and in which feature exists one of the essential parts of the invention, is that of the valve mechanism thereof. This mechanism is of simple construction, direct in operation, and in the form thereof illustrated suffices to control the admission to, the compression and expansion in, and the exhaust from both ends of the high-pressure cylinders comprised in the motor and to also control the admission to and exhaust from both ends of the low-pressure cylinder.

An important object sought to be obtained in the present valve mechanism is such a construction thereof as will enable its actuation in proper sequence to be accomplished from the main or driving shaft to the motor without the intervention of cams, tappets, springs, or like devices ordinarily used in controlling the operation of valve mechanisms of internal-combustion motors.

A further feature characterizing the invention is the provision of a compound internal-combustion motor comprising at least one high-pressure cylinder and one low-pressure cylinder, each of which is double-acting—that is to say, a motor in which there occurs in the high-pressure cylinder an explosive pressure-generating action upon both sides of the piston, while the piston of the low-pressure cylinder is alternatively exposed on opposite sides thereof to the pressure of the expanding products of combustion discharged from the high-pressure cylinder or cylinders.

In the drawings accompanying the present specification, Figure 1 is mainly a plan view of a three-cylinder compound internal-combustion motor embodying the features of the present improvements. Fig. 2 is a sectional view, the plane of the section passing through the axis of the main or driving shaft of the motor. Fig. 3 is a side elevation of the motor, certain gear-box covers being removed. Fig. 4 is a sectional view, upon a somewhat enlarged scale, of the valve-actuating mechanism of the present motor, the section being taken through the axis of the motor-shaft and passing through the axes of the shaft of the bevel-wheels comprised in the transmitting mechanism. Fig. 5 is a plan of the parts represented in Fig. 4, part of the motor-framing being removed for the purpose of showing the mechanism lying on the opposite side thereof. Fig. 6 is a longitudinal sectional view upon the same scale as Figs. 5 and 4, illustrating the construction of the valve parts controlling the ingress of the fuel to the high-pressure cylinders and the exhaust from the low-pressure cylinder, the device for transmitting a reciprocatory movement to this valve from a rotary part being indicated at the right in the figure. Fig. 7 represents the valve-rod, valve-chest end, slotted cross-head, and sliding block indicated in Fig. 6. Figs. 8 to 15, inclusive, are sectional views illustrating the relative positions of the valves controlling the exhaust from the high-pressure cylinders into the low-pressure cylinder, these positions being those assumed at definite times in the complete cycle of movements through which the parts pass. Figs. 16 to 23, inclusive, are sectional views correspondingly illustrating the relative positions of the valves controlling the admission to the high-pressure chambers and the exhaust from the low-pressure chambers of the motor.

Similar characters of reference designate corresponding parts in all the figures.

The form or embodiment of the present invention which is illustrated in the drawings represents the application of the various features of the latter to an internal-combustion motor of the compound type, including in its organization a low-pressure cylinder and a pair of high-pressure cylinders, both of which latter are double-acting in that the organization provides for an explosion of a charge on each side of the piston of each high-pressure cylinder.

In further explanation of the general mode of operation it should be stated that the exhaust from the high-pressure cylinders is made into the low-pressure cylinder, whose piston is therefore exposed on both sides to the expansive action of the products of combustion discharged from the high-pressure cylinders. Moreover, while the motor in the form illustrated is of the horizontal type—that is, one having horizontally-reciprocating pistons—it is obvious that the invention is readily applicable to a motor with vertical or inclined cylinders.

Specifically, the high-pressure cylinders are designated by 29 and 30, respectively, (they being in this instance substantial duplicates,) while the low-pressure cylinder 31 is here located between them. The main shaft 32 is a crank-shaft, being in this case a three-throw shaft having cranks 33 and 34 in the same angular position relative to the axis of the crank-shaft, and a crank 35 at one hundred and eighty degrees from the two former cranks.

Referring to the valve mechanism of the present motor, it may again be stated before an explanation thereof is entered upon that each high-pressure cylinder is of the four-cycle type—that is, two complete reciprocations of each piston, or, in other words, two complete revolutions of the crank-shaft, represent the passage of each cylinder and piston through a complete cycle of operations whose repetition is commenced at the beginning of the third reciprocation—that each high-pressure cylinder is double-acting, or, in other words, that the cycle of operations at each side of each piston is the same as that occurring on the opposite side thereof, and that the exhaust from each end of each high-pressure cylinder takes place into the corresponding end of the low-pressure cylinder, the crank of which latter, it has already been stated, is one hundred and eighty degrees from the cranks of the high-pressure cylinder. Premising the further statement that the operation of the valves necessary to accomplish the proper cycle of movements in each cylinder is effected from a simple valve mechanism embodying no cams, springs, or like parts in its construction, but embracing throughout rotary parts whose main source of motion is the motor-shaft, the detail description of the valves and valve-operating mechanism will now be entered upon.

Rigid with the motor-shaft is a gear-ring 36, meshing with a gear 37, secured to a shaft 38, mounted in bearings in a frame part 39. The gear 37 is one-half of the diameter of the gear-ring 36, and hence makes two revolutions to one revolution of the latter. The shaft 38 drives a shaft 40, mounted in bearings in the frame part 39 and a cover-plate 41 of the gear-box 42 through an intermittent movement of the so-called "Geneva stop" type, embodying a disk 43, formed with a full periphery except adjacent to the opposite sides of a driving-tooth 44, which is adapted to engage with driving-spaces in a notched disk 45, secured to the shaft 40. Intermediate the drive-spaces in the disk 45 the latter is provided with concave portions 48, adapted to lie in close relation to the main peripheral portion of the toothed disk 43 during the major portion of rotary movement of the latter—that is, when the tooth thereof is not in driving connection with a notch on the disk 45—being locked thereby in the position to which it has been turned. In this instance the disk 45 is provided with eight notches, and hence during each revolution of the motor-shaft disk 45, and therefore shaft 40, will be turned through an angular distance corresponding to the angle between two consecutive notches, or, in other words, one-eighth of a full rotation. Rigid with the shaft 40 is a bevel-gear 49, which meshes with and is twice the diameter of a bevel-gear 50, secured to a shaft 51, mounted to rotate in one of the walls of the gear-box 42 and in the walls of a gear-box 52. The shaft 51 will thus rotate one-half a turn for every full rotation of the motor-shaft and for every two rotations of the latter will make a full turn.

In parallel disposition with respect to the shaft 51 is a shaft 53, mounted in bearings in gear-boxes 52 and 54 and driven by meshing gears 55 56 from the shaft 51. All the valves are driven from the shaft 53 by means of respective connections analogous to a slotted cross-head, in the slot of which is mounted a sliding box or bearing, in which takes a crank-pin, the respective valves and the various slotted crank connections and driving-crank pins being so related that the only motion transmitted to the valve is a reciprocatory one in line with its axis. Shaft 51, and therefore shaft 53, each rotating one-half turn for every full rotation of the crank-shaft, each crank-pin actuating a valve is designed to perform a complete revolution for every two turns of the motor-shaft, satisfying the condition, therefore, that a cycle of operations occurring in each cylinder end shall be completed with the parts in their initial position, ready for a second cycle at the conclusion of each two turns of the motor-shaft.

At each end of the shaft 53 is a crank-arm 57, from which projects a crank-pin 58, journaled in a bearing 59, slidably mounted in a corresponding cross-head 60, extending transversely to a valve-stem 61. The valve-stem 61, rigid with which is the slotted cross-head 60 at the right in Fig. 3, controls the inlet of the fuel to the crank ends of the high-pressure cylinders and the exhaust from the crank end of the low-pressure cylinder, while correspondingly the cross-head 60 at the left-hand side of Fig. 3 is rigid with the valve-stem 61, whose valve parts (hereinafter described more in detail) function similarly with regard to the opposite ends of the cylinders.

In order that the shock incident to the striking of the tooth 44 against the sides of the notched portions of the disk 45 shall be reduced and the life of the parts thereby increased, means are shown for initiating the angular movement of the disk 45 immediately prior to the engagement of the said driving-tooth with the side of each notch in which it works. This means here consists of a disk 62, having a series of radially projecting portions 63 equal in number to the number of notches in the disk 45 and so located that a rotary striker 64, secured to the shaft 38, will impinge against a projection 63 and start the angular movement of the disk 45 immediately before the tooth 44 comes in engagement with the drive-socket on the disk.

The valve parts or valves proper, rigid with the respective valve-stems 61 61, and which serve to control admission to the high-pressure cylinders and the exhaust from the low-pressure cylinder on opposite sides of the several pistons, are identical in construction and function for the two stems, these latter being driven, as aforesaid, from the rotary shaft 53. The description, therefore, given of one set of these valve parts will be understood to apply to the other. One valve set works in a valve-chest 65 at the crank end of the motor and the other set in a similar chest 65 at the opposite end of the motor, these valve-chests extending transversely to the axes of the cylinders.

Referring in detail to the construction of that set of valve parts working at the crank end of the motor, each high-pressure cylinder opens into the valve-chest through a port 66, inlet 67 for the supply being disposed in line with the respective ports 66. These inlets 67 may be connected together and suffice for the ingress of a combustible mixture to the high-pressure cylinders. A port 68 opens from the low-pressure cylinder into the valve-chest, a discharge-outlet 69 from the latter being disposed in line with such port.

Secured to each valve stem or rod 61 is a piston-valve 70, which is of an axial length sufficient when the valve-rod is in its central longitudinal position (see, for instance, Figs. 21 and 23) to cover the port 68 and prevent the exhaust from the low-pressure cylinder. When, however, the valve-rod is shifted to either of its extreme longitudinal positions, the port 68 is uncovered and a discharge takes place into that portion of the valve-chest whose end walls are formed by the end face of the piston 70 and a piston 71 or a piston 72, as the case may be. By the shifting of the valve-rod these exhaust-spaces of the valve-chest are brought alternately into communication with the discharge-outlet 69. The pistons 72 are secured to the valve-rod in respective positions such that they do not during the reciprocatory motion of the valve-rod cover either of the ports 66 66.

The piston-valve 71 is of such axial dimension and occupies such a position on the valve-rod as to secure a proper timing in the admission and cutting off of the supply to the high-pressure cylinder, and, referring to its position as shown at the right in Figs. 20, 21, 22, and 23, the admission takes place only while the driving-crank of the valve-rod is at and near its extreme position in line with the valve-rod, and as indicated in Fig. 22, during the time that the crank remains temporarily at rest at the other three-quarter points of its rotation the inlet-port is covered and no admission takes place. It is during this shutting off of the supply that explosion, expansion, and subsequent compression takes place.

The high-pressure cylinder 29 is provided with ports 76, controlled by valves 73, which communicate, by means of ports 75, with the respective ends of the low-pressure cylinder, and the high-pressure cylinder 30 is similarly provided with ports 76, controlled by valves 74, communicating with the respective ends of the low-pressure cylinder by means of ports 75. These valves 73 73 74 74 work in suitable valve-chests 65'.

Each valve 73 74 is provided with a stem 73', having integral with it a slotted cross-head 73'', in the slot of which a box 74', driven by a crank 74'' in a manner analogous to the crank-driven valves already described. The particular means illustrated for thus reciprocating the valves comprise a shaft 77, mounted in suitable bearings and having at each end a crank-pin working in the boxes in the slotted cross-heads rigid with the stems of the valves controlling the exhaust from the opposite ends of the high-pressure cylinder at the right-hand side of the motor looking from the crank end thereof. Similarly a shaft 77 controls the operation of the valves for the two ends of the other high-pressure cylinder.

The cranks at the opposite end of one rotary shaft 77 are placed at ninety degrees from each other, and similarly for the cranks extending from the other shaft 77, while the relation between the corresponding cranks— that is, the cranks at relatively the same ends of the two shafts 77 77—are one hundred and eighty degrees apart.

The shafts 77 77 are driven from the aforesaid shaft 53 by means of a pair of spiral gears of relatively the same diameter 78 79, the latter being secured to a shaft 80, running transversely of the axes of the cylinders and carrying two spiral gears 81 82, which mesh, respectively, with a gear 83, secured to one shaft 77, and a gear 84, secured to the other shaft 77.

Each of the piston-valves 73 74 is provided with an annular space 85, which is brought by the intermittent rotation of the operating-cranks at one of the periods of rest of the crank opposite the ports 75 76, allowing free communication thereby from the high-pressure cylinder to the low-pressure cylinder. The solid portions of each piston-valve are of such proportions longitudinally of the valve-stem as to close communication, however, between the two cylinder-spaces during the remaining travel of the operating-cranks. A valve mechanism so constructed, proportioned, and organized suffices for such a control of the motive fluid as to accomplish results represented by the movement of a four-cycle compound double-acting three-cylinder internal-combustion motor through its various cycle of operations.

It will be obvious that while one form of device has been illustrated any organization of parts adapted to effect the same result may be resorted to within the purview of this invention, and it will also be noted that the principle of this invention may be applied to any character of gas-engine.

Having thus described my invention, I claim—

1. In combination with a four-cycle compound double-acting internal-combustion motor embodying a plurality of high-pressure cylinders, and a low-pressure cylinder, and having separate valves for controlling the exhaust from the respective ends of each high-pressure cylinder into the respective ends of the low-pressure cylinder, admission-valves for controlling the admission of motive fluid to the respective ends of the high-pressure cylinder, and valves for controlling the exhaust from the respective ends of the low-pressure cylinder, of means for controlling all of said valves in sequential timing and comprising an intermittently-rotary shaft through which said valve-controlling means is actuated, and mechanism interposed between said shaft and the motor-shaft, said mechanism comprising an intermittently-movable member, a continuously-moving member and a member carried by said continuously-moving member for intermittently engaging successive portions of the intermittently-movable member.

2. In combination with a four-cycle compound double-acting internal-combustion motor embodying a plurality of high-pressure cylinders, and a low-pressure cylinder, and having separate valves for controlling the exhaust from the respective ends of each high-pressure cylinder into the respective ends of the low-pressure cylinder, admission-valves for controlling admission of motive fluid to the respective ends of the high-pressure cylinder, and valves for controlling the exhaust from the respective ends of the low-pressure cylinder, of means for controlling all of said valves in sequential timing and comprising four cranks set at ninety degrees apart for actuating the valves from the high-pressure cylinders to the low-pressure cylinder, a pair of cranks set at one hundred and eighty degrees apart each for actuating the high-pressure admission and the low-pressure exhaust at one end of the cylinders, means for revolving said cranks, and means controlled from the motor-shaft for intermittently actuating the same.

3. In combination with a four-cycle compound double-acting internal-combustion motor embodying a plurality of high-pressure cylinders, and a low-pressure cylinder, and having separate valves for controlling the exhaust from the respective ends of each high-pressure cylinder into the respective ends of the low-pressure cylinder, admission-valves for controlling the admission of motive fluid to the respective ends of the high-pressure cylinder, and valves for controlling the exhaust from the respective ends of the low-pressure cylinder, of means for controlling all of said valves in sequential timing and comprising four cranks set ninety degrees apart for actuating the valves from the high-pressure cylinders to the low-pressure cylinder, a pair of cranks set one hundred and eighty degrees apart each for actuating the high-pressure admission and the low-pressure exhaust at one end of the cylinders, and means controlled from the motor-shaft for revolving said cranks.

Signed at Nos. 9 to 15 Murray street, New York city, New York, this 11th day of August, 1904.

AUGUSTO DINA.

Witnesses:
FRED. W. BARNACLO,
FRED. J. DOLE.